United States Patent
Ree et al.

(10) Patent No.: US 9,689,709 B2
(45) Date of Patent: Jun. 27, 2017

(54) APPARATUS AND METHODS TO MIRROR A BATTERY OPERATED INSTRUMENT

(75) Inventors: Bradley Richard Ree, Atlanta, GA (US); John Christopher Boot, Atlanta, GA (US)

(73) Assignee: Aclara Meters LLC, Hazelwood, MO (US)

( * ) Notice: Subject to any disclaimer, the term of this patent is extended or adjusted under 35 U.S.C. 154(b) by 649 days.

(21) Appl. No.: 13/370,880

(22) Filed: Feb. 10, 2012

(65) Prior Publication Data

US 2013/0211753 A1    Aug. 15, 2013

(51) Int. Cl.
- G06F 19/00    (2011.01)
- G01D 4/00    (2006.01)
- H02J 13/00    (2006.01)

(52) U.S. Cl.
CPC .......... *G01D 4/002* (2013.01); *H02J 13/0006* (2013.01); *Y02B 90/241* (2013.01); *Y04S 20/32* (2013.01)

(58) Field of Classification Search
CPC ....... Y02B 90/241; Y04S 20/32; G01D 4/002; H02J 13/006
USPC .......................................................... 702/62
See application file for complete search history.

(56) References Cited

U.S. PATENT DOCUMENTS

| | | | |
|---|---|---|---|
| 7,035,207 B2 * | 4/2006 | Winter et al. | 370/225 |
| 2003/0179721 A1 * | 9/2003 | Shurmantine et al. | 370/315 |
| 2004/0008691 A1 * | 1/2004 | Winter | H04L 45/122 370/395.31 |
| 2005/0206506 A1 * | 9/2005 | Kulesz | G08B 21/12 340/286.02 |
| 2007/0155417 A1 * | 7/2007 | Levenson | H04W 48/20 455/525 |
| 2007/0180309 A1 * | 8/2007 | Zohar et al. | 714/6 |
| 2008/0088475 A1 | 4/2008 | Martin | |
| 2009/0146838 A1 * | 6/2009 | Katz | 340/870.02 |
| 2011/0169658 A1 * | 7/2011 | Feldman et al. | 340/870.02 |
| 2012/0046824 A1 * | 2/2012 | Ruther et al. | 701/31.5 |
| 2012/0089523 A1 * | 4/2012 | Hurri | G06Q 10/10 705/304 |
| 2013/0024928 A1 | 1/2013 | Burke et al. | |
| 2013/0073705 A1 * | 3/2013 | Hester | 709/223 |
| 2014/0148925 A1 * | 5/2014 | Ahn et al. | 700/19 |

FOREIGN PATENT DOCUMENTS

GB    2469952    3/2011

* cited by examiner

*Primary Examiner* — John Breene
*Assistant Examiner* — Peter Ngo
(74) *Attorney, Agent, or Firm* — Polster, Lieder, Woodruff & Lucchesi, L.C.

(57) ABSTRACT

Techniques for mirroring to allow for data transmissions from a device through mirror capable device. In an embodiment, a plurality of mirror capable devices may report their capability, which may include signaling conditions related thereto. A mirror capable device may be selected from the plurality of mirror capable devices based on signaling conditions associated with the utility device's power consumption.

18 Claims, 5 Drawing Sheets

APPARATUS AND METHODS TO MIRROR A BATTERY OPERATED INSTRUMENT

TECHNICAL FIELD

The present disclosure relates to communication between instruments and in particular the mirroring of instruments.

BACKGROUND

An energy services interface (ESI), which may be located in an electric meter, for example, provides security and coordination functions that enable secure interactions between relevant home area network (HAN) devices and a utility company. The ESI is the top of the network and may provide pricing, messaging, demand response/load control (DRLC) events, timing, and maintain keys. It also may provide auditing or logging functions that record transactions to and from home area networking devices.

Typically the ESI is capable of receiving information from a battery powered meter, and presents an interface to other home area network (HAN) devices. The battery powered meter may wake up and post its metering data to the ESI.

BRIEF DESCRIPTION OF THE INVENTION

Disclosed herein are methods, apparatuses, and systems for mirroring instruments. In an embodiment, a plurality of mirror capable devices may report their capability. A mirror capable device may be selected from the plurality of mirror capable devices based on signaling conditions associated with a utility device's power consumption. HAN devices may query the mirror capable device instead of the utility device.

In an embodiment, a method is provided including the steps of determining the signaling conditions of mirror capable devices, selecting a mirror capable device based on the signaling conditions associated with power consumption of a utility device, and forming a mirror between the selected mirror capable device and the utility device.

In another embodiment, a utility device is configured to determine the signaling conditions of mirror capable devices, select a mirror capable device based on the signaling conditions associated with power consumption of transmitting data to the mirror capable device, and transmit data to the selected mirror capable device.

In yet another embodiment, a system includes a utility device, and a mirror capable device selected from a plurality of mirror capable devices, the selected mirror capable device configured to receive data from the utility device, the received data mirrored by the selected mirror capable device, the selection based on power consumption of the utility device associated with signaling conditions between the utility device and the selected mirror capable device.

This Brief Description of the Invention is provided to introduce a selection of concepts in a simplified form that are further described below in the Detailed Description. This Brief Description of the Invention is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

These and other features, aspects, and advantages of the present subject matter will become better understood when the following detailed description is read with reference to the accompanying drawings, wherein.

DETAILED DESCRIPTION OF THE INVENTION

A mirroring device may be a constantly powered line powered device capable of receiving information from a utility device (e.g. a battery powered utility device). The mirror device may present an interface to other home area network (HAN) devices as if the mirrored device is located inside the constantly powered line device. For example, battery powered gas and water meters may use a line powered device to act as a mirror. Periodically a battery powered meter may wake up from a reduced power mode and transmit metering data to a mirror device or the data communications component may wake up from a reduced power mode and transmit metering data to a mirror device. The battery powered meter may then go back to sleep or reduced power mode, or the data communications component may return to a reduced power mode. HAN devices may interface with the mirror device and retrieve the latest data. Mirror devices may be located in an energy services interface (ESI).

In an embodiment, the line powered device which has the mirror may perform the functions as the mirrored device. The line powered mirror may simply respond to meter reads from other HAN devices, or may be programmed to post the mirrored data to the ESI. The line powered device may further register a mirror with the ESI, such that the ESI responds the same as if the gas meter was mirroring directly with the ESI.

In an embodiment, the transmit power of a gas meter may be reduced and the battery life of the gas meter may be extended if the closest powered device is selected as a mirror device. In an embodiment, the closest device may be defined as the device with the lowest signal loss between a battery powered transmitter and a line powered receiver.

Figure 1:
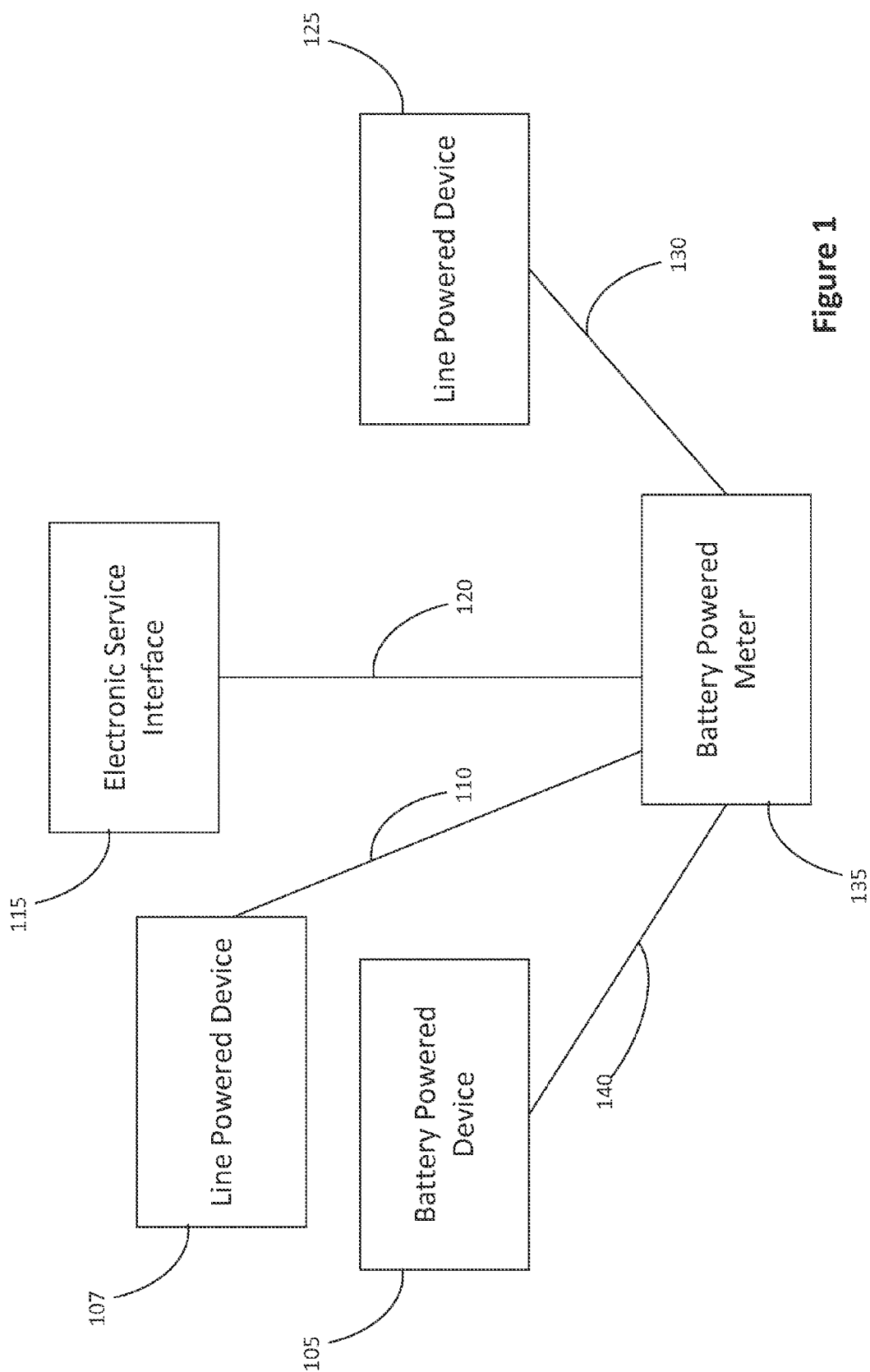
FIG. 1 is a graphical representation of an exemplary, non-limiting network in which mirroring of a utility device instrument may occur.

FIG. 1 is a graphical representation of an exemplary, non-limiting network in which mirroring of a battery operated instrument may occur. All devices in FIG. 1 may be communicatively connected and may communicate via wires or wirelessly. At block 105 there may be a battery powered device connected via connection 140 to battery powered meter 135. At block 107 there may be a line powered device connected via connection 110 to battery powered meter 135. At block 115 there may be an electronic service interface connected via connection 120 to battery powered meter 135. At block 125 there may be a line powered device connected via connection 130 to battery powered meter 135.

In an embodiment, all the devices and interfaces in FIG. 1 may connect to battery powered meter 135 via a wireless connection. Battery powered meter 135 may use a different transmit power to communicate with each device. For example, connection 140 (signal to noise ratio or received signal strength) may be at 10 dB, connection 110 may be at 15 dB, connection 120 may be at 20 dB, and connection 130 may be at 5 dB. Line powered device 125 may be chosen as a mirror device because of the low transmit power needed by battery powered meter 135 to connect via connection 130, in comparison with the other devices.

Although discussed herein is the use of line powered devices as a mirror device, battery powered devices may also be used as a mirror device. In an embodiment, battery powered device 105 may be the closest device to battery powered meter 135 and therefore may be chosen as the mirror device. Battery powered device 105 may not need to conserve as much energy as battery powered meter 135 because it may have a large battery, a battery recharging source (e.g., recharged via solar or wind), may use power much more efficiently due its configuration, or the like. In an embodiment, the closer battery powered device 105 may be ignored in instances where battery powered device 105 may not be reliably or determinatively awake when the battery powered meter 135 is ready to write (this may also apply to constantly powered, e.g., line powered, devices).

Figure 2:
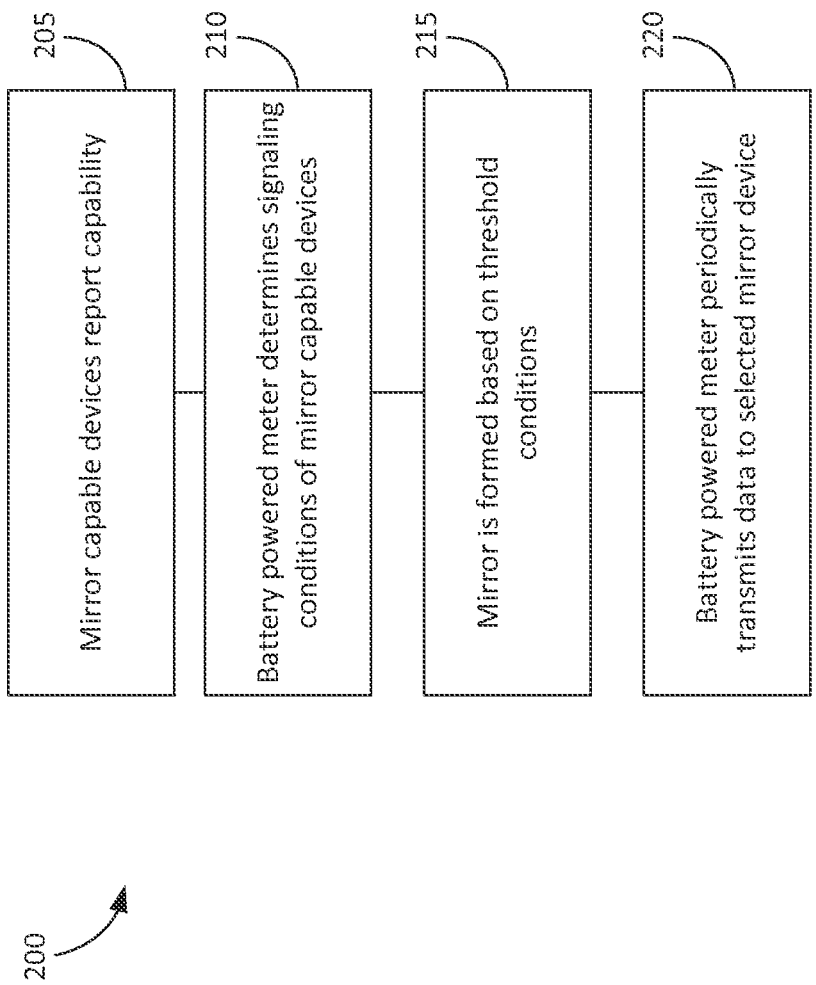
FIG. 2 is a non-limiting example method of performing an embodiment of the present disclosure.

FIG. 2 is a non-limiting example method of performing an embodiment of the present disclosure. Method 200 may be performed by computing equipment including servers, routers, smart meters, mobile devices or any other device that can execute computing functions. At block 205, mirror capable devices may report their mirror device capability. At block 210, a battery powered meter may determine signaling conditions to each mirror capable device. At block 215, a mirror device is selected based on predetermined threshold conditions. At block 220, the battery powered meter periodically transmits data to the selected mirror device.

In an embodiment, the threshold condition may be associated with the transmit power needed to reach the mirror capable device. In an embodiment, a threshold condition may be associated with line quality (e.g., packet loss or degradation). If packet loss is high on a mirror capable device it may cause the battery powered meter to transmit multiple times and therefore unappealingly drain more power (even with a low transmit power), the battery powered meter may choose a mirror capable device with less packet loss. In an embodiment, multiple conditions may be considered, such as a condition associated with the reliability of the mirror capable device in receiving transmitted data (e.g., the mirror capable device may frequently be in a condition, such as powered off, that will not allow reception of data) and a condition associated with the mirror capable devices power source (e.g., line or battery powered).

Figure 3:
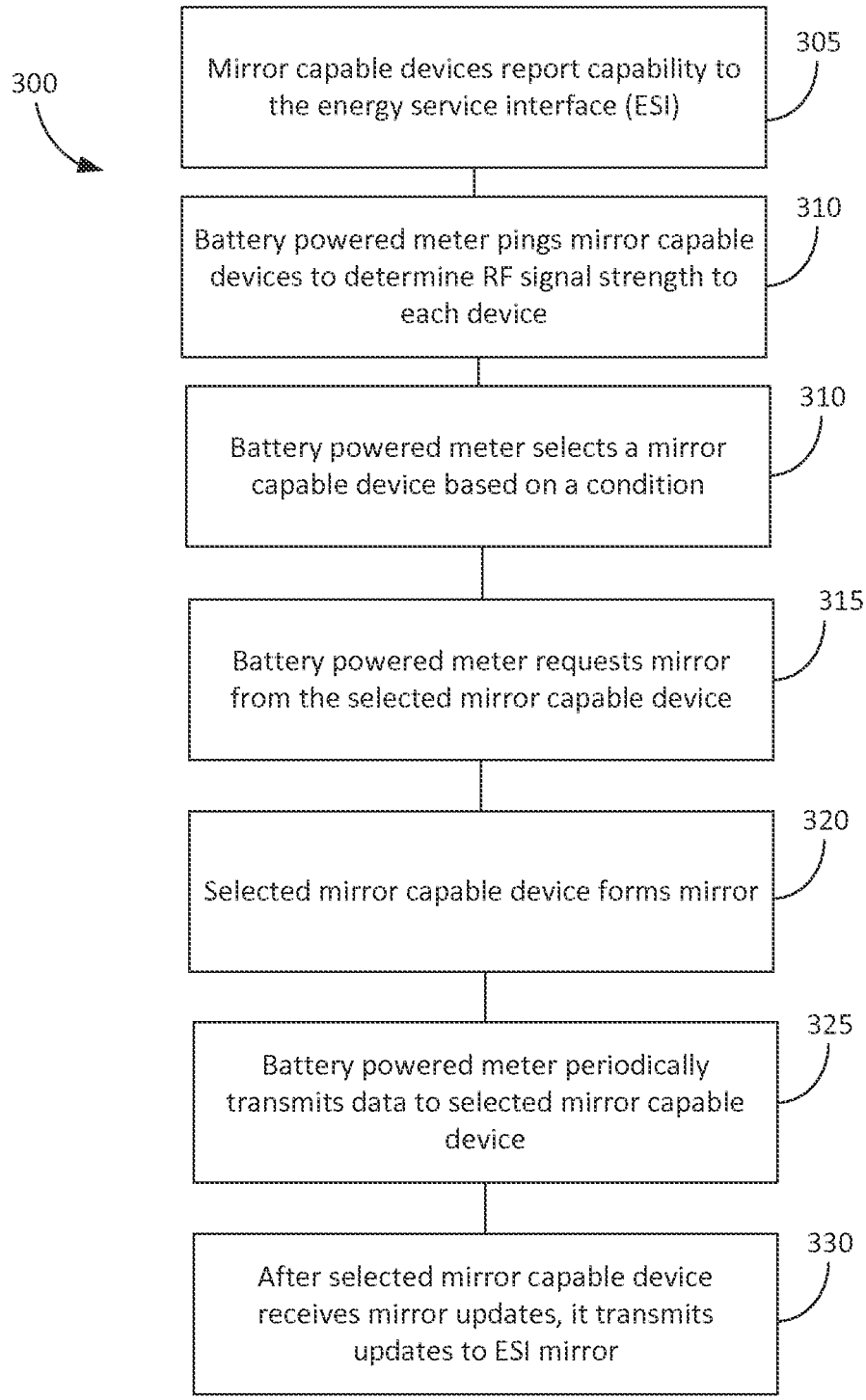
FIG. 3 is a non-limiting example method of performing an embodiment of the present disclosure.

FIG. 3 is a non-limiting example method of performing an embodiment of the present disclosure. Method 300 may be performed by computing equipment including servers, routers, smart meters, mobile devices or any other device that can execute computing functions. At block 305, each mirror capable device may report its mirror device capability to an ESI. At block 310, a battery powered meter may ping the mirror capable devices to determine RF signal strength to each device. The battery powered meter may select a mirror capable device based on a condition. The condition may comprise one or a combination of RF signal strength, device power source, and device availability, among other things. At block 315, the battery powered meter may request a mirror form the selected mirror capable device. At block 320, the selected mirror capable device may form a mirror. At block 325, the battery powered meter may periodically transmit data to the selected mirror capable device. At block 330, the selected mirror capable device may transmit the mirror updates to the ESI mirror after it receives the mirror updates from the battery powered meter.

Figure 4:
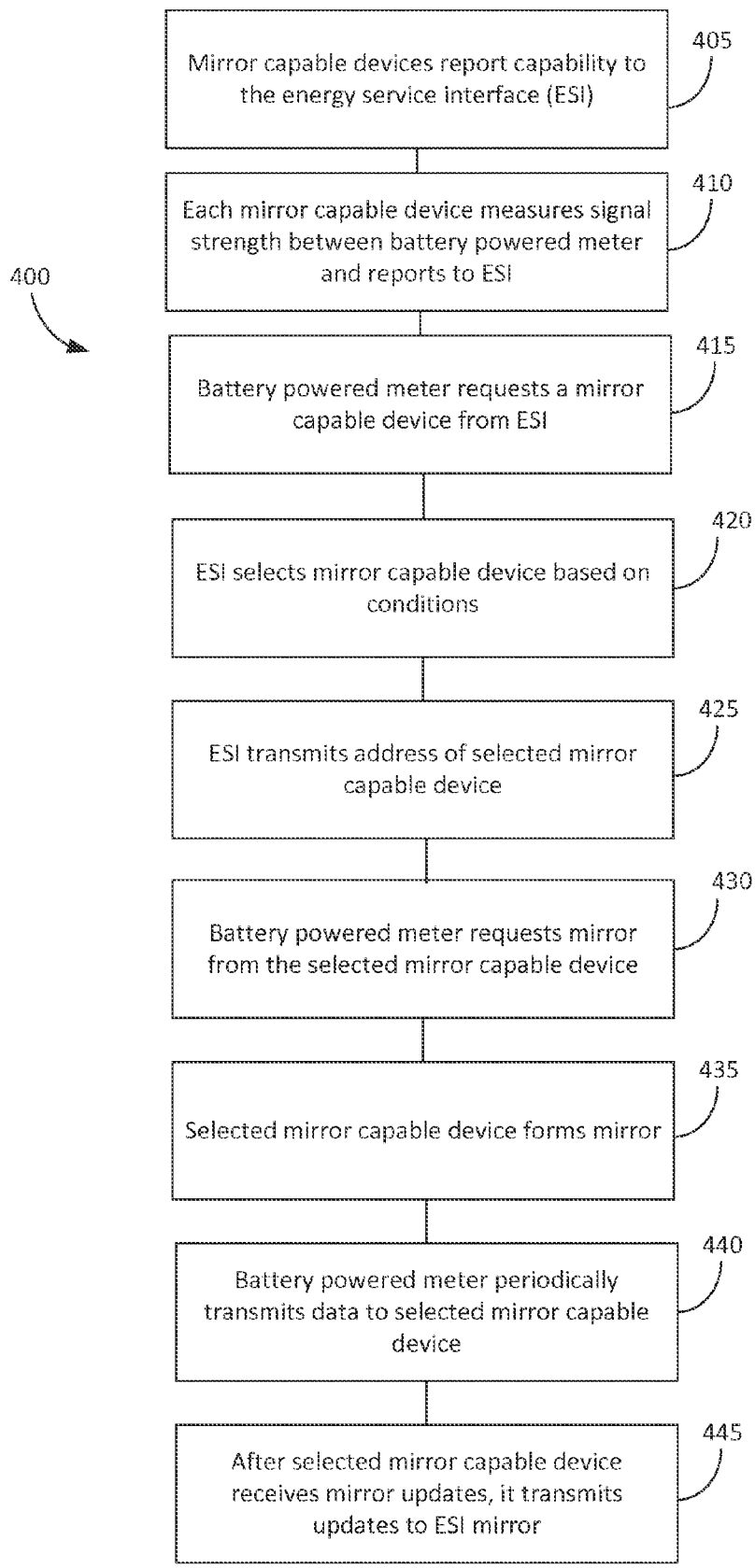
FIG. 4 is a non-limiting example method of performing an embodiment of the present disclosure.

FIG. 4 is a non-limiting example method of performing an embodiment of the present disclosure. Method 400 may be performed by computing equipment including servers, routers, smart meters, mobile devices or any other device that can execute computing functions. At block 405, each mirror capable device may report its mirror device capability to an ESI. At block 410, each mirror capable device may measure the signal strength to the battery powered meter and report the signal strength to the ESI. At block 415, a battery powered meter may request a mirror capable device from ESI. At block 420, the ESI may select the mirror capable device based on conditions. The conditions may comprise one or a combination of signal strength, device power source, and device availability, among other things. At block 425, the ESI may transmit an address (e.g., IP address) of the selected mirror capable device to the battery powered meter. At block 430, the battery powered meter may request a mirror from the selected mirror capable device. At block 435, the selected mirror capable device may form a mirror. At block 440, the battery powered meter may periodically transmit data to the selected mirror capable device. At block 445, the after selected mirror capable device may receive mirror updates and transmit the mirror updates to the ESI mirror.

The conditions associated with a mirror capable device may change over the course of time. For example, the transmit power needed to communicate with a mirror capable device may increase or decrease because of weather conditions or device degradation. In an embodiment, the threshold conditions may be checked periodically and a new mirror device may be selected based on the previous or new threshold conditions. In an embodiment, the threshold conditions may dynamically change based on analysis of power consumption data of a particular meter/mirror device combination, power consumption data from a plurality of meter/mirror device combinations (e.g., a county or region), or the like.

Without in any way limiting the scope, interpretation, or application of the claims appearing herein, a technical effect of one or more of the example embodiments disclosed herein is to provide adjustments to communication protocols so that battery life of a battery powered meter may be extended. Another technical effect of one or more of the embodiments disclosed herein is that the battery powered meter may select the mirror device closest to it. This selection of a mirror device close to the meter may result in faster response time and less power consumption.

Figure 5:
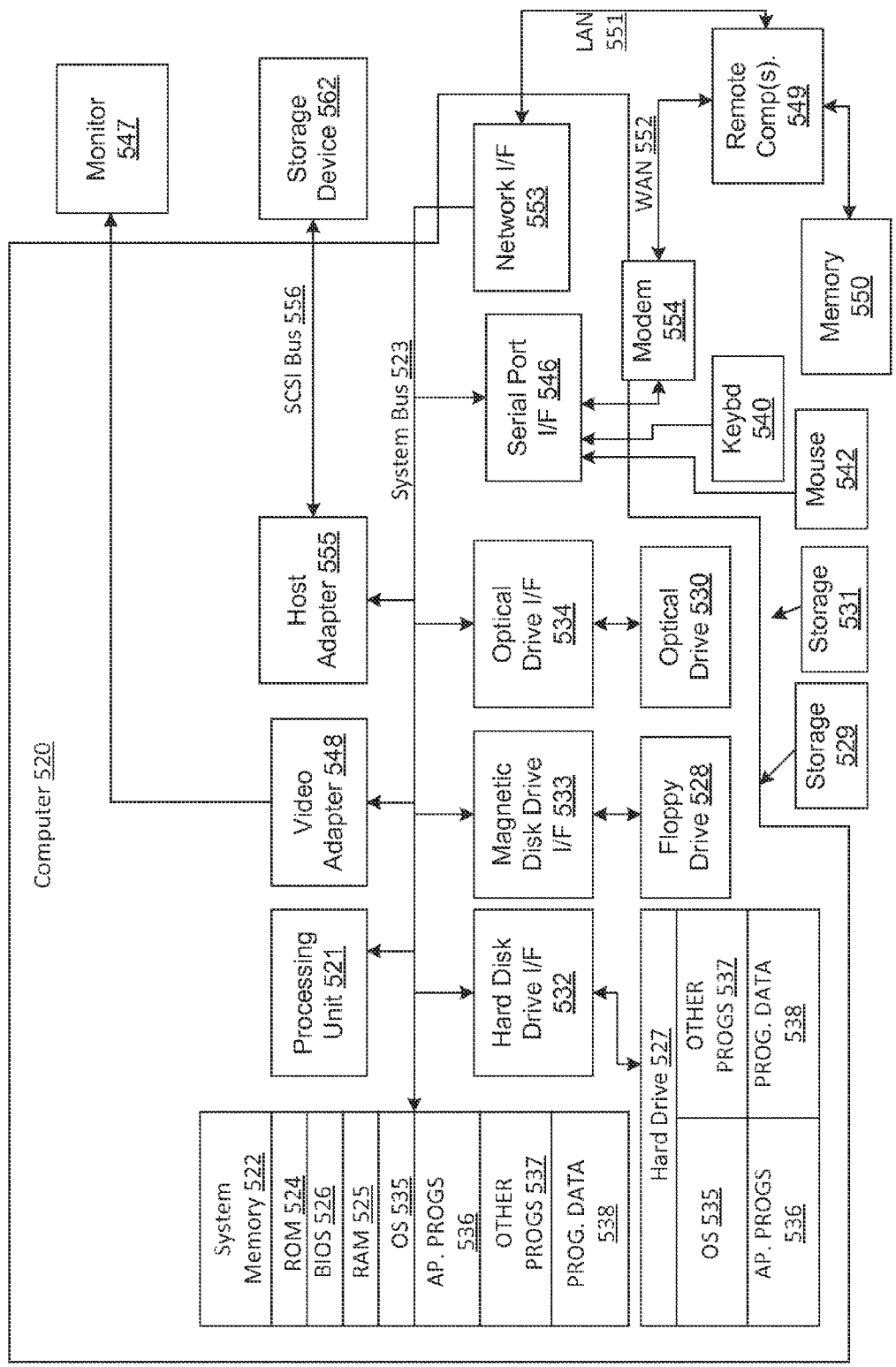
FIG. 5 is an exemplary block diagram representing a general purpose computer system in which aspects of the present invention thereof may be incorporated.

FIG. 5 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, smart meters, mainframe computers and the like. The invention may also be practiced in distributed computing environments where tasks are performed by remote processing devices that are linked through a communications network. In a distributed computing environment, program modules may be located in both local and remote memory storage devices.

FIG. 5 is a block diagram representing a general purpose computer system in which aspects of the present invention and/or portions thereof may be incorporated. As shown, the exemplary general purpose computing system includes a computer 520 or the like, including a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read-only memory (ROM) 524 and random access memory (RAM) 525. A basic input/output system 526 (BIOS), containing the basic routines that help to transfer information between elements within the computer 520, such as during start-up, is stored in ROM 524.

The computer 520 may further include a hard disk drive 527 for reading from and writing to a hard disk (not shown), a magnetic disk drive 528 for reading from or writing to a removable magnetic disk 529, and an optical disk drive 530 for reading from or writing to a removable optical disk 531 such as a CD-ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide non-volatile storage of computer readable instructions, data structures, program modules and other data for the computer 520.

Although the exemplary environment described herein employs a hard disk, a removable magnetic disk 529, and a removable optical disk 531, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 529, optical disk 531, ROM 524 or RAM 525, including an operating system 535, one or more application programs 536, other program modules 537 and program data 538. A user may enter commands and information into the computer 520 through input devices such as a keyboard 540 and pointing device 542. Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, a computer may include other peripheral output devices (not shown), such as speakers and printers. The exemplary system of FIG. 5 also includes a host adapter 555, a Small Computer System Interface (SCSI) bus 556, and an external storage device 562 connected to the SCSI bus 556.

The computer 520 may operate in a networked environment using logical connections to one or more remote computers, such as a remote computer 549. The remote computer 549 may be a personal computer, a server, a router, a network PC, a peer device or other common network node, and may include many or all of the elements described above relative to the computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets, and the Internet.

When used in a LAN networking environment, the computer 520 is connected to the LAN 551 through a network interface or adapter 553. When used in a WAN networking environment, the computer 520 may include a modem 554 or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing a communications link between the computers may be used.

Computer 520 may include a variety of computer readable storage media. Computer readable storage media can be any available media that can be accessed by computer 520 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 520. Combinations of any of the above should also be included within the scope of computer readable media that may be used to store source code for implementing the methods and systems described herein. Any combination of the features or elements disclosed herein may be used in one or more embodiments.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method of operating a home area network (HAN) having a plurality of HAN utility network devices and having an associated energy services interface (ESI), the method comprising:

transmitting within the HAN a request for a mirror-capable device to act as a mirror to perform functions within the HAN on behalf of a particular network utility device that is battery powered;

in response to receiving the transmitted request, determining a plurality of values representing a power consumption required by the particular utility device of the plurality of utility network devices to transmit utility device data to a respective selected one of a plurality of mirror-capable network devices within the HAN associated with the ESI wherein the particular utility device is operational, wherein the plurality of network devices includes the plurality of mirror-capable network devices, and the values for each mirror-capable network device including at least the following minimal set of mirror-capable device characteristics:

an availability of each mirror-capable network device to act as a mirror for the particular network device, a report from each mirror-capable network device of its mirror-device capability that can be provided to the particular network device, a power source of each mirror-capable network device, a transmission power needed to communicate between the particular network device and each mirror-capable network device, and a quality of a transmission line between the particular network device and each mirror-capable network device;

selecting one of the plurality of mirror-capable network devices to be a mirroring device to act as a mirror to perform functions within the HAN on behalf of the particular utility device based on at least one of the plurality of values for two or more of the minimal set of mirror-capable device characteristics in response to the received request, wherein at least one of the two or more mirror-capable device characteristics includes the power source for the mirror capable device and wherein selecting is responsive to the power source being substantially greater than the battery power source of the particular network device;

registering with the ESI the selected mirror-capable network device as the mirror for the particular network device, wherein the ESI is configured to treat the registered mirror of the selected mirror-capable network device as the particular network device; and forming a mirror to perform the functions within the HAN on behalf of the particular utility device at the selected and registered mirror-capable network device such that the selected mirror-capable network device is thereafter configured to:

receive the transmitted utility device data from the particular utility device;

store received utility device data; and operate as an interface that performs the HAN device functions on behalf of the particular utility device including responding to a request from the ESI to read the stored received utility device data of the particular utility device and in response thereto transmitting the requested stored utility device data of the particular utility device to the ESI and in lieu of the particular utility device transmitted the utility data to the ESI and in lieu of the ESI requesting and in return receiving the utility device data directly from the particular utility device.

2. The method of claim 1, further comprising the process of transitioning the particular utility device from a reduced power mode to an increased power mode, and wherein the particular utility device is configured to transmit the request for a mirror and to transmit the utility device data to the selected one of the plurality of mirror-capable network devices when in the increased power mode.

3. The method of claim 2, wherein, when in the increased power mode, the particular utility device includes an interface that is configured to respond to requests from the ESI to read utility device data directly from the particular utility device in lieu of transmitting the utility device data from the particular utility device to the selected mirror-capable device.

4. The method of claim 1, wherein the selection of the mirror-capable device is a function of the mirror-capable device being line powered.

5. The method of claim 1, wherein the utility device data includes an amount of utility consumption monitored by a meter.

6. The method of claim 1, wherein the values upon which determining which mirror-capable network device further includes the power consumption required by the particular utility device to transmit utility device data to a respective one of the plurality of mirror-capable network devices based upon a radio frequency signal connection strength between the particular utility device and the respective one of the plurality of mirror-capable network devices.

7. The method of claim 1, wherein the selecting of the mirror-capable network device includes the values for the connection signal condition of signal loss between the particular utility device and the selected mirror-capable network devices being based on the selected mirror-capable device having the lowest signal loss.

8. The method of claim 1, wherein the selected one of the plurality of mirror-capable network devices is configured to transfer the particular utility device data to the ESI, wherein the ESI is an interface between the home area network and a utility company network.

9. The method of claim 1, wherein the selected one of the plurality of mirror-capable network devices is in a function performed by the ESI, wherein the ESI is also an interface between the HAN and a utility company network.

10. The method of claim 9, wherein the selected one of the plurality of mirror-capable network devices registers with the ESI as a selected mirror device for the particular utility device such that the ESI communicates with the registered mirror device as if the ESI was communicating directly with the particular utility device.

11. The method of claim 1, wherein the selected one of the plurality of mirror-capable network devices is thereafter configured to be the selected one of the plurality of mirror-capable network devices to which the particular utility device periodically transmits utility device data and to which the selected mirror-capable device receives the utility device data from the particular utility device.

12. The method of claim 1, wherein each of the plurality of mirror-capable network devices is configured for reporting to the ESI one of the plurality of values representing a power consumption required by the particular utility device to transmit utility device data to each respective one of the plurality of mirror-capable network devices.

13. The method of claim 1, wherein selecting the one of the plurality of network mirror-capable devices as the mirroring device for the particular utility device based on the plurality of values includes comparing the plurality of values to a threshold value.

14. The method of claim 1, wherein the step of selecting includes selecting one of the plurality of mirror-capable network devices that has a power source that provides power for a greater duration than the power source of another one of the plurality of mirror-capable network devices.

15. The method of claim 1, wherein the transmitting of the request for a mirror capable device to act as a mirror is originated, by the particular utility device.

16. The method of claim 1, wherein the transmitting of the request for a mirror capable device to act as a mirror for the particular utility device is originated by the ESI.

17. A utility device operating in a home area network (HAN) having a plurality of network devices and having an associated energy services interface (ESI), comprising:
   a utility meter configured to measure utility data, the utility meter being powered by a battery and being a wireless communication connection to one or more of a plurality of network devices within the HAN that are both battery and line powered;
   a processor; and
   a memory comprising computer executable instructions that, when executed by the processor, cause the processor to:
   receive a request for a mirror-capable device to act as a mirror to perform functions within the HAN on behalf of the utility meter;
   in response to receiving the request, determine a plurality of values representing a power consumption required by a particular utility device to transmit utility device data to a respective one of a plurality of mirror-capable network devices, wherein the plurality of network devices includes the plurality of mirror-capable network devices, and the values for each mirror-capable network device including at least the following minimal set of mirror-capable device characteristics:
      an availability of each mirror-capable network device to act as a mirror for the particular network device,
      a report from each mirror-capable network device of its mirror-device capability that can be provided to the particular network device,
      a power source of each mirror-capable network device,
      a transmission power needed to communicate between the particular network device and each mirror-capable network device, and
      a quality of a transmission line between the particular network device and each mirror-capable network device;
   select one of the plurality of mirror-capable network devices as a mirroring device for the particular utility device based on at least one of the plurality of values for two or more of the minimal set of mirror-capable device characteristics in response to the received request, wherein at least one of the two or more mirror-capable device characteristics includes the power source for the mirror capable device and wherein selecting is responsive to the power source having a longer duration power supply than the battery powered particular device;
   transmit utility device data from the particular utility device to the selected one of the plurality of mirror-capable network devices;
   register with the ESI the selected mirror-capable network device as the mirror for the particular network device, wherein the ESI is configured to treat the registered mirror of the selected mirror-capable network device as the particular network device; and
   form a mirror to perform the functions within the HAN on behalf of particular utility device, the mirror being formed at the selected one of the plurality of mirror-capable network devices, whereby, upon forming the mirror, the selected one of the plurality of mirror-capable network devices is thereafter configured to:
      receive the transmitted utility device data from the particular utility device;
      store received utility device data; and
   operate as an interface that performs the HAN device functions on behalf of the particular utility device including receiving a request from the ESI to read the stored received utility device data of the particular utility device and to transmit the requested stored utility device data of the particular utility device to the ESI in response thereto, and in lieu of the particular utility device transmitting the utility device data to the ESI in response to receiving the request therefrom.

18. An energy services interface (ESI) of a home area network (HAN) having a plurality of HAN utility network devices communicatively coupled and operational therein, comprising:
   a processor; and
   a memory comprising computer executable instructions that, when executed by the processor, cause the processor to:
   receiving within the HAN a request for a mirror-capable device to act as a mirror to perform functions within the HAN on behalf of a particular network utility device that is battery powered and that communicates with the ESI using a wireless interface;
   in response to receiving the request, determine a plurality of values representing a power consumption required by the particular utility device to transmit utility device data from the particular utility device to a respective one of a plurality of mirror-capable network devices, wherein a plurality of network devices includes the plurality of mirror-capable network devices, and the values for each mirror-capable network device including at least the following minimal set of mirror-capable device characteristics:
      an availability of each mirror-capable network device to act as a mirror for the particular network device,
      a report from each mirror-capable network device of its mirror-device capability that can be provided to the particular network device,
      a power source of each mirror-capable network device,
      a transmission power needed to communicate between the particular network device and each mirror-capable network device, and
      a quality of a transmission line between the particular network device and each mirror-capable network device;
   select one of the plurality of mirror-capable network devices as a mirroring device to act as a mirror to perform functions within the HAN on behalf of the particular utility device based on at least one of the plurality of values for two or more of the minimal set of mirror-capable device characteristics in response to the received request, wherein at least one of the two or more mirror-capable device characteristics includes the power source for the mirror-capable device and wherein selecting is responsive to the power source of the selected mirror-capable device being line-powered;

registering with the ESI the selected mirror-capable network device as the mirror for the particular network device, wherein the ESI is configured to treat the registered mirror of the selected mirror-capable network device as the particular network device; and form a mirror to act as a mirror to perform functions within the HAN on behalf of the particular utility device at the selected one of the plurality of mirror-capable network devices, wherein, upon forming a mirror, the selected one of the plurality of network devices is thereafter configured to:

receive the transmitted utility device data from the particular utility device;

store received utility device data; and operate as an interface that performs the HAN device functions on behalf of the particular utility device including responding a request from the ESI to read the stored received utility device data of the particular utility device and in response thereto transmitting the requested stored utility device data of the particular utility device to the ESI and in lieu of the particular utility device transmitting the utility data to the ESI and in lieu of the ESI receiving the utility device data directly from the particular utility device;

wherein the ESI is communicatively connected to the particular utility device and each of the plurality of network devices.

\* \* \* \* \*